Figure 1:
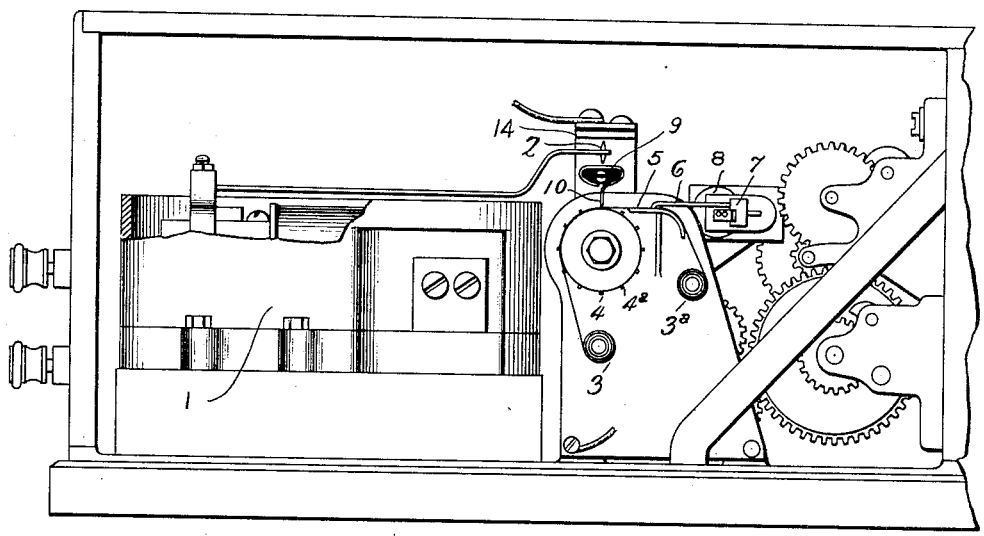

L. T. ROBINSON.
ELECTRIC RECORDING INSTRUMENT.
APPLICATION FILED OCT. 13, 1902.

910,956. Patented Jan. 26, 1909.

3 SHEETS—SHEET 1.

WITNESSES:

INVENTOR:
Lewis T. Robinson;
by Albert G. Davis
Atty.

L. T. ROBINSON.
ELECTRIC RECORDING INSTRUMENT.
APPLICATION FILED OCT. 13, 1902.

910,956.

Patented Jan. 26, 1909.

3 SHEETS—SHEET 2.

Witnesses:

Inventor:
Lewis T. Robinson,
by Albert G. Davis,
Att'y.

L. T. ROBINSON.
ELECTRIC RECORDING INSTRUMENT.
APPLICATION FILED OCT. 13, 1902.

910,956.

Patented Jan. 26, 1909.

3 SHEETS—SHEET 3.

Witnesses:
Geo. A. Thornton.
Helen Oxford

Inventor:
Lewis T. Robinson,
by Albert G. Davis,
Atty.

UNITED STATES PATENT OFFICE.

LEWIS T. ROBINSON, OF SCHENECTADY, NEW YORK, ASSIGNOR TO GENERAL ELECTRIC COMPANY, A CORPORATION OF NEW YORK.

ELECTRIC RECORDING INSTRUMENT.

No. 910,956.  Specification of Letters Patent.  Patented Jan. 26, 1909.

Application filed October 13, 1902. Serial No. 127,035.

*To all whom it may concern:*

Be it known that I, LEWIS T. ROBINSON, a citizen of the United States, residing at Schenectady, in the county of Schenectady, State of New York, have invented certain new and useful Improvements in Electric Recording Instruments, of which the following is a specification.

This invention relates to recording devices for measuring instruments or indicating instruments in which great accuracy of indication is required and where a permanent record is desired of a series of progressive readings.

The invention is especially designed for use in electric measuring instruments such as voltmeters, ammeters, wattmeters and the like, and will be illustrated in connection with that type, although it is of general application and may be applied to any instrument where a delicate or weak deflecting force is inherent in the instrument and where for that reason a minimum resistance to freedom of motion of the pointer or indicator is desirable.

The object of the invention is to arrange the recording systems so that the indicating needle may swing freely without the opposition of frictional engagement with the tape or sheet on which the record is made.

A further object of the invention is to permit a true record of the readings to be made on ordinary paper not having a special ruling; in many forms of recording apparatus the paper is ruled with curved lines coincident with the arc shaped traverse of the needle point. The point swinging in an arc across the recording strip would occupy a different position lengthwise of the record strip at different angular deflections. In order therefore to render the reading accurate on the strip, it is necessary to provide printed lines having a curvature corresponding to that of the path of the point.

I carry out my improvements by making the point an electrode and causing it to swing in an electro-static field, employing a sufficiently high-potential to jump a short air-gap between the electrode and the boundaries of the field, a record strip being in the circuit, or, preferably, between the electrode and a series of conductors arranged edgewise beneath its line of travel, which are electrically connected with conducting styles or points placed in a line crosswise of the paper and bearing upon the same, or in close relation thereto. The conducting pieces beneath the electrode have sufficient length to confront the latter in any position of its arc of travel, thereby providing an air-gap of uniform width between the electrode and some conducting strip in any position of its deflection. The electrode moves through a gap between two metal surfaces connected in a high potential circuit, imposing a potential sufficient to jump the gap, and the points or styles which bear upon or lie in close relation to the record-strip are placed in a right line transverse to the strip. By this means, when the pointer is deflected, a spark passes across the gap to the particular confronting plate corresponding to its indication and is carried by a conductor connected with that plate to one of the styles bearing upon or opposing the paper strip; the latter being given uniform travel by clockwork, or other similar means, a record is impressed upon it by the passage of the current.

The record strip may be saturated with a chemical such as bromid of potassium or an iron salt similar to that employed in chemical telegraphy, or it may be ordinary paper. In the latter case the transit of the sparks punctures the paper, leaving a record in the form of a series of small holes. I prefer, however, to employ a chemical paper by which a more legible trace is left.

My invention therefore comprises a recording system for indicating or measuring instruments in which the indicating needle moves freely, and recording impulses are communicated at its different positions to a series of recording styles arranged with reference to a record strip to produce a right line record. It comprises also an indicator by which a record is made through an air-gap and which moves in a field where the electrostatic strains are at all times uniform. It comprises also other features of novelty which will be more particularly hereinafter described and will be definitely indicated in the claims appended to the specification.

Figure 2:
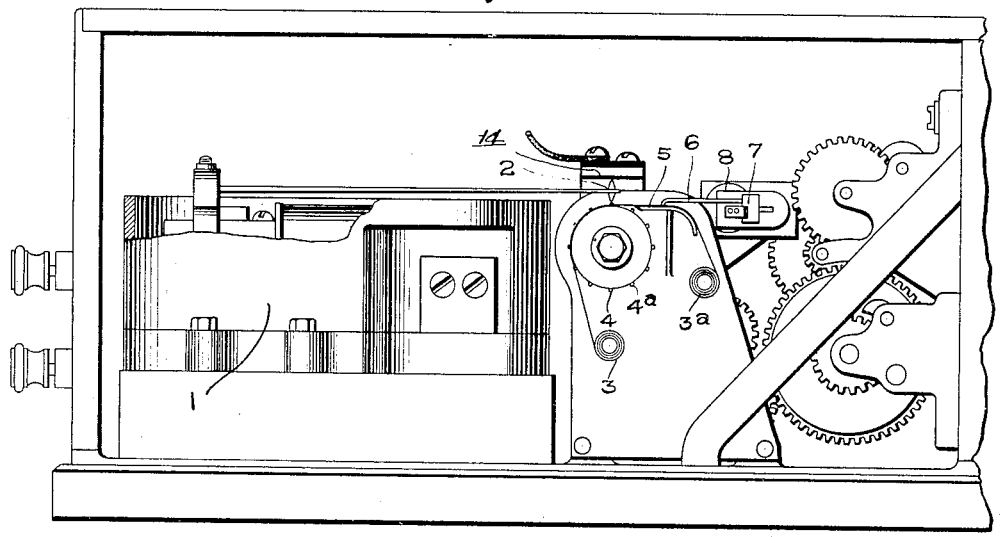
Figure 3:
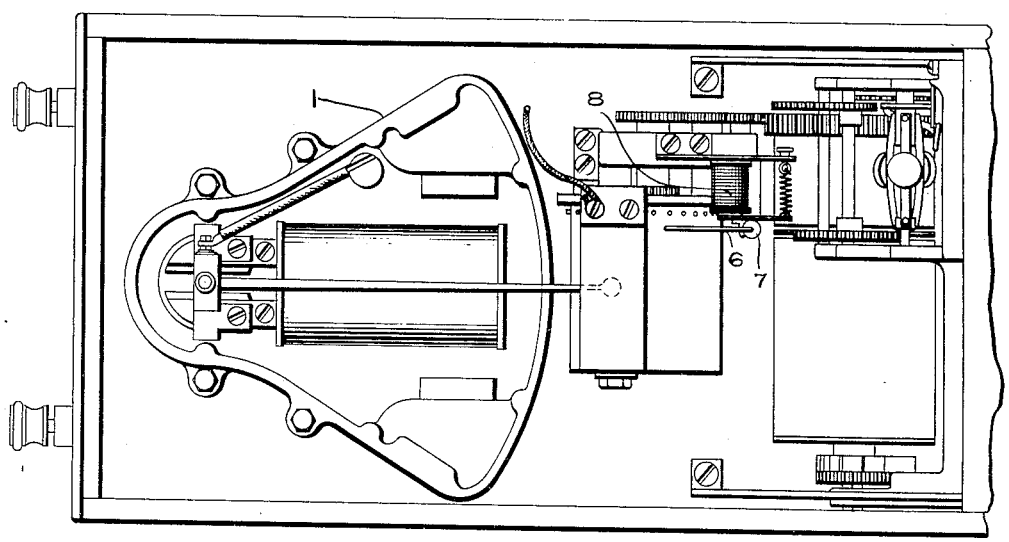
Figure 4:
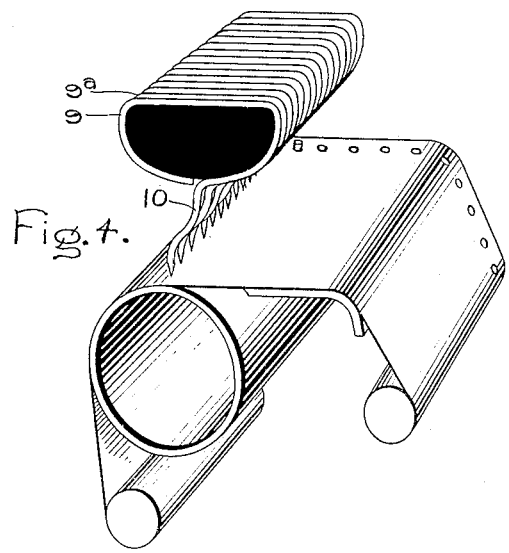
Figure 5:
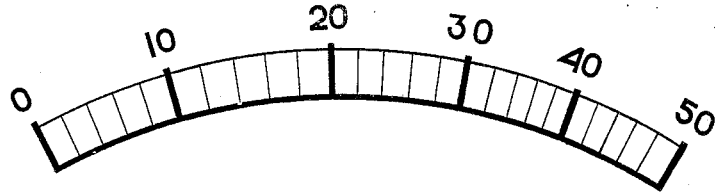
Figure 6:
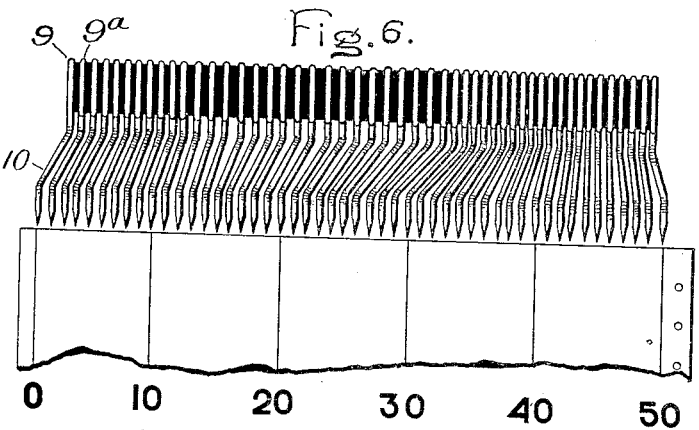
Figure 7:
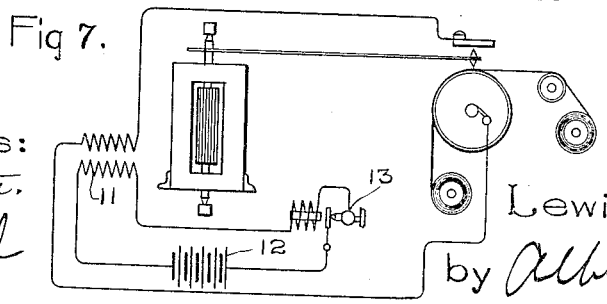

In the accompanying drawings which illustrate the invention, Figure 1 is a side elevation of an instrument embodying one form of my improvements; Fig. 2 is a side elevation of an instrument embodying another form of my improvements; Fig. 3 is a plan view thereof; Figs. 4, 5 and 6 are details of the form shown in Fig. 1; and Fig. 7 is a diagram of the system.

Referring first to Fig. 1, 1 represents an electric measuring instrument such as a voltmeter or other measuring instrument in which the deflecting force is weak, and in which for that reason it is desirable not to have the movements of the pointer opposed by frictional resistance.

With the form shown in Fig. 1 I provide the indicating needle with a metal electrode 2 which swings freely over a row of metallic conductors stacked side by side and separated by an insulating medium, which conductors are electrically connected with a series of recording styles or pens in operative relation to the paper. The paper is operated by a spring motor being carried from a reel, as 3, and wound upon a companion reel 3ª. The paper is punched on the edge with holes corresponding to pins 4, 4ª secured in the periphery of a wheel or drum operated by the motor.

The recording system will be understood from an examination of Figs. 4, 5 and 6. The needle plays over but out of contact with a series of metal conductors 9, 9ª, etc., preferably stacked closely side by side with intervening spaces of insulation. A sufficient number of these conductors is employed to form a metal surface beneath the electrode of the needle throughout its entire range of deflection. These metallic pieces may be sheets of metal or simply wires bent into suitable shape and then assembled in a pile as indicated in Fig. 4. Each metal strip connects with a style, as 10, which lies in close relation to the record strip and preferably touches the same as indicated in Fig. 4, the range of styles being in a right line transverse to the record strip. By this means the needle, although it swings in the arc of a circle, impresses its deflections at a proper position on the paper, and unruled paper may be used for the record strip. Further than this, the styles 10 may be spaced in any desired operative relation at the will of the designer.

Irregularities of the scale of the measuring instrument can be corrected and the instrument can be made to give equal ordinates for equal increments for energy by spacing the styles irregularly to overcome the irregularities of the ordinates due to the law of the instrument, notwithstanding the natural law of the instrument would render these ordinates quite irregular. Thus an instrument whose scale would be more open at one end than at the other, as shown in Fig. 5, may be made to give a record on the paper that is absolutely uniform by spacing the styles as shown in Fig. 6, and no ruling whatever on the paper is required either as to ordinates or abscissæ. The styles 10 may be, if desired, arranged out of contact with the record strip and the spark be made to jump across from the points to the metal drum over which the paper is carried. The metal plate 14 and the metal drum are connected to a high-potential source of electric energy capable of jumping the gaps in the circuit. This may be furnished by an induction coil 11 (see Fig. 7) excited by a local circuit, including a battery 12 and a buzzer 13. I prefer to employ a prepared paper containing a chemical decomposable by an electric current, as for example a compound containing starch or dextrin and bromid of potassium or other suitable salt which, on decomposition by the current, will leave a visible trace or stain on the paper. Thus a record may be made of the deflections of the most delicate measuring instruments.

In the modified form of the instrument shown in Figs. 2 and 3 a record is obtained which follows the same scale law as the instrument, since the indicating needle 2 swings back and forth over a chemically-prepared record strip penetrated by pins 4 and 4ª on a metal wheel or drum which drives the record strip and forms a metal surface beneath the needle throughout its entire range of deflection. The record strip passes across a bench or table 5 above which a tubular pen 6 fed by ink from a fountain 7 is normally held out of recording relation to the record strip, but it is brought into contact therewith periodically by means of an electromagnet 8 controlled by a clock in an external circuit. By this means a record showing uniform intervals of time is imprinted by means of the pen on the record strip side by side with the record of the deflections of the needle. The high potential circuit is connected to the drum and to a metal plate 14 mounted directly over the indicating needle which sweeps over the strip of chemically-treated paper carried on the drum, and the discharge from the metal plate 14, through the needle and paper to the drum traces on the paper a record of the movements of the needle.

In either form of instrument an electrostatic field exists on each side of the needle, which equalizes the strain on the needle and prevents it from being bent downwardly or upwardly from its path, thereby preventing an increased friction on the bearings, and also the tendency of an electrostatic charge to distort the needle from its free path of movement. The electrostatic field on each side of the needle is secured by placing the metal plate in such a relation to the metal drum or to the metallic plates 9 9ª that the needle swings adjacent the plate in a space in which the electrostatic stress is practically uniform.

What I claim as new and desire to secure by Letters Patent of the United States, is—

1. In a recording instrument, the combination with an electrode and means for moving the electrode responsive to the energy to be measured, of a conducting member mounted adjacent the path of movement of the electrode, means for moving a record sheet between said member and said electrode, a second conducting member mounted adjacent said electrode for nullifying the effect of electrostatic stress between said members on the movement of the electrode, and means for maintaining a difference of potential between said members.

2. In a recording instrument, the combination with an electrode and means responsive to the energy to be measured for moving the electrode, of a conducting member mounted on one side of the path of movement of the electrode, means for moving a record sheet between said member and said electrode, a second conducting member mounted on the other side of the electrode for nullifying the effect of electrostatic stress between said members on the movement of the electrode, and means for maintaining a difference of potential between said members.

3. In a recording instrument, the combination with an electrode and means responsive to the energy to be measured for moving the electrode, of a conducting member mounted on one side of the path of movement of the electrode and co-extensive therewith, means for moving a record sheet between said member and said electrode, a second conducting member mounted on the other side of the electrode parallel to and co-extensive with the first member for nullifying the effect of electrostatic stress between said members on the movement of the electrode, and means for maintaining a difference of potential between said members.

4. A recording instrument provided with a traveling sheet, an indicator with an air gap on each side moving between two parallel metallic surfaces each extending throughout the path of movement of the indicator to uniformly distribute the electrostatic stress between said members throughout the path of movement of the indicator, and separated from the indicator by an air gap, a recording device connected with one of the surfaces, and means for operating the same through the air gaps in the several positions of the indicator.

5. A recording instrument provided with a traveling record sheet, a series of recording styles supported over the same along a line of ordinates of the curve to be recorded, a series of metallic surfaces connected with the styles, a conducting surface parallel to and co-extensive with the series of metallic surfaces, an electrode moving between said surfaces and separated from each surface by an air gap, and a source of high electric potential connected to said conducting surface to effect an electric discharge across the gaps and through the record sheet.

6. In a recording instrument, the combination with an electrode movable in response to the amount of energy to be measured, of insulated metallic sections mounted on one side of said electrodes and separated therefrom by an air gap, a conductor for supporting a record sheet in electrical relation to said sections, a second conductor parallel to said sections for producing a uniform electrostatic stress between said second conductor and said sections throughout the path of movement of the electrode and separated from said electrode by an air gap, and means for maintaining a difference of potential between said conductors.

7. A recording system for measuring energy comprising a series of recording styles arranged on a line of ordinates, means for causing a chemical record surface to move in operative relation beneath said styles, an electrode movable in response to variations of energy to be measured, and means producing a uniform electrostatic stress throughout the path of movement of the electrode for causing an electric discharge through the electrode to the record sheet.

8. In an electric recording instrument, the combination with a needle deflected in accordance with an irregular scale law, of a marking device energized by said needle and arranged to counteract the irregularities in the movement of said needle to produce a record in accordance with a regular scale law.

9. An electric recording instrument provided with a traveling record surface, a series of recording styles equally spaced, and a series of energizing devices for said styles spaced in accordance with an irregular scale law.

10. An electric recording instrument provided with a traveling record surface, a series of recording styles equally spaced, a series of metallic surfaces operatively related to the needle and differently spaced according to the scale law of the instrument, a freely movable needle, and electrical means for energizing the styles through the needle in its different angles of deflection, independently of frictional contact of the needle.

11. An electric recording instrument comprising an arm and means for moving said arm in response to the energy variations to be recorded, means for supporting a record sheet, a plurality of conductors located between the end of said arm and said record sheet, a plate for distributing uniformly the electrostatic stress between said plate and said conductors located on the opposite side of said arm from said conductors, and a source of high current potential connected to said plate and to the means for supporting the record sheet.

12. An electric recording instrument comprising an arm and means for moving said arm in response to the energy variations to be recorded, means for supporting a record sheet, a plate located on one side of said arm in close relation to its end but out of contact therewith, a source of high current potential connected to said plate and to the means for supporting the record sheet, and a plurality of conductors located between the end of the moving arm and the record sheet and arranged to produce a uniform electrostatic stress between said plate and said conductors and so that the curve traced on the sheet by the electrical discharge therethrough will be moved equal distances across the sheet for equal variations in the energy recorded.

In witness whereof, I have hereunto set my hand this 10th day of October, 1902.

LEWIS T. ROBINSON.

Witnesses:
BENJAMIN B. HULL,
HELEN ORFORD.